United States Patent [19]

Palm

[11] Patent Number: 4,473,541

[45] Date of Patent: Sep. 25, 1984

[54] LOW WATER CONTENT SULFUR RECOVERY PROCESS

[75] Inventor: John W. Palm, Tulsa, Okla.

[73] Assignee: Standard Oil Company (Indiana), Chicago, Ill.

[21] Appl. No.: 499,749

[22] Filed: May 31, 1983

[51] Int. Cl.³ .......................................... C01B 17/04
[52] U.S. Cl. ..................... 423/574 R; 55/23
[58] Field of Search ........... 423/573 R, 573 G, 574 R, 423/574 G, 222, 220, 224, 242 R; 55/23

[56] References Cited

U.S. PATENT DOCUMENTS

| 903,353 | 11/1908 | Block | 55/23 |
|---|---|---|---|
| 3,752,877 | 8/1973 | Beavon | 423/573 R |
| 3,798,316 | 3/1974 | Beavon | 423/574 G |
| 4,310,497 | 1/1982 | Deschamps et al. | 423/573 G |
| 4,426,369 | 1/1984 | Palm | 423/574 R |
| 4,430,317 | 2/1984 | Reed et al. | 423/574 R |

FOREIGN PATENT DOCUMENTS 918384 1/1973 Canada.

OTHER PUBLICATIONS

"BSR/Selectox I Sulfur Recovery Process For Claus Tail Gas Treating"—Beavon and Hass. 5th Canadian Symposium on Catalysis. 1977.
"Developments in Selectox Technology"—Beavon et al. 7th Canadian Symposium on Catalysis 1980.

Primary Examiner—Earl C. Thomas
Assistant Examiner—Jeffrey E. Russel

[57] ABSTRACT

Claus plant tail gas is treated to further reduce sulfur content by hydrogenating all sulfur compounds to hydrogen sulfide, pressurizing the resulting stream and cooling to reduce water content therein, and removing hydrogen sulfide from the resulting stream of reduced water content.

5 Claims, 1 Drawing Figure

LOW WATER CONTENT SULFUR RECOVERY PROCESS

FIELD OF THE INVENTION

The invention relates generally to sulfur recovery and in one particular aspect, to an improved Claus process effluent stream (Claus plant tail gas stream) cleanup process.

BACKGROUND OF THE INVENTION

The conventional catalytic Claus process for sulfur recovery from sulfur containing gas streams is widely practiced and accounts for approximately one half of total sulfur production. However, the effluent tail gas from a final of a series of reactors in a Claus plant can contain varying quantities of different compounds including sulfur, water, hydrogen sulfide, sulfur dioxide, carbonyl sulfide, and carbon disulfide as well as other compounds.

Strict environmental standards on sulfur emissions require in many cases a further reduction in the total quantity of sulfur compounds present in a Claus plant tail gas. As a result, a number of Claus plant tail gas cleanup processes have been developed. Certain of these processes share a process sequence in which water, a reaction product of the Claus conversion, can be removed thus favoring further removal of sulfur compounds by Claus conversion.

One such process is described in Beavon, Canadian Pat. No. 918 384 (1973) which hydrogenates a Claus plant tail gas stream to convert all sulfur compounds to hydrogen sulfide followed by cooling the resulting hydrogen sulfide containing stream in a contact condenser to remove water, and optionally followed by a desiccator to further reduce water content, before further Claus conversion.

Another such process is described in "BSR/Selectox I Sulfur Recovery Process for Claus Tail Gas Treating," by Beavon and Hass, presented at the Fifth Canadian Symposium on Catalysis, Oct. 26–27, 1977, which discloses a process for removal of sulfur from a Claus plant tail gas stream by hydrogenating the Claus tail gas stream to convert all sulfur compounds to hydrogen sulfide followed by cooling the resulting stream in a contact condenser to remove water, introduction of a source of molecular oxygen, for example, air, and direct oxidation of hydrogen sulfide to sulfur over a proprietary Selectox-32 catalyst.

A process which can utilize contact condensers to remove water from an hydrogenated Claus plant tail gas stream followed by Claus conversion (reaction of hydrogen sulfide and sulfur dioxide to form elemental sulfur) in the absence of free oxygen is described in copending application Ser. No. 343,661, filed Jan. 28, 1982, which discloses hydrogenating a Claus plant tail gas stream to convert all sulfur compounds to hydrogen sulfide, cooling the resulting stream at least in part in a contact condenser (quench tower) to remove water, converting at least a portion of the resulting hydrogen sulfide to sulfur dioxide, then converting the resulting sulfur dioxide plus the remaining hydrogen sulfide to sulfur by low temperature Claus conversion, preferably below the solidification (freezing) point of sulfur (about 240° F.).

It will be readily appreciated by those skilled in sulfur recovery that additional improved processes which can be selected for specific uses to meet the technical and environmental requirements of the specific application in an economic and efficient way are highly desirable.

SUMMARY OF THE INVENTION

According to the invention, a process for the recovery of sulfur comprises converting substantially all sulfur compounds in a Claus plant tail gas stream to hydrogen sulfide, pressurizing the thus produced hydrogen sulfide stream to an effective process operating pressure in excess of about 5 psig, introducing the thus pressurized hydrogen sulfide containing stream into a cooling aone to cool same and to condense water therefrom, and introducing the thus pressurized hydrogen sulfide containing stream of reduced water content into a hydrogen sulfide removal zone to reduce the content of hydrogen sulfide therein by Claus catalytic conversion.

The invention will be further understood and alternative equivalents for carrying out the invention will be clear from the following detailed description and the drawings in which:

FIG. 1 represents a preferred embodiment of the invention.

DETAILED DESCRIPTION OF THE INVENTION

Figure 1:
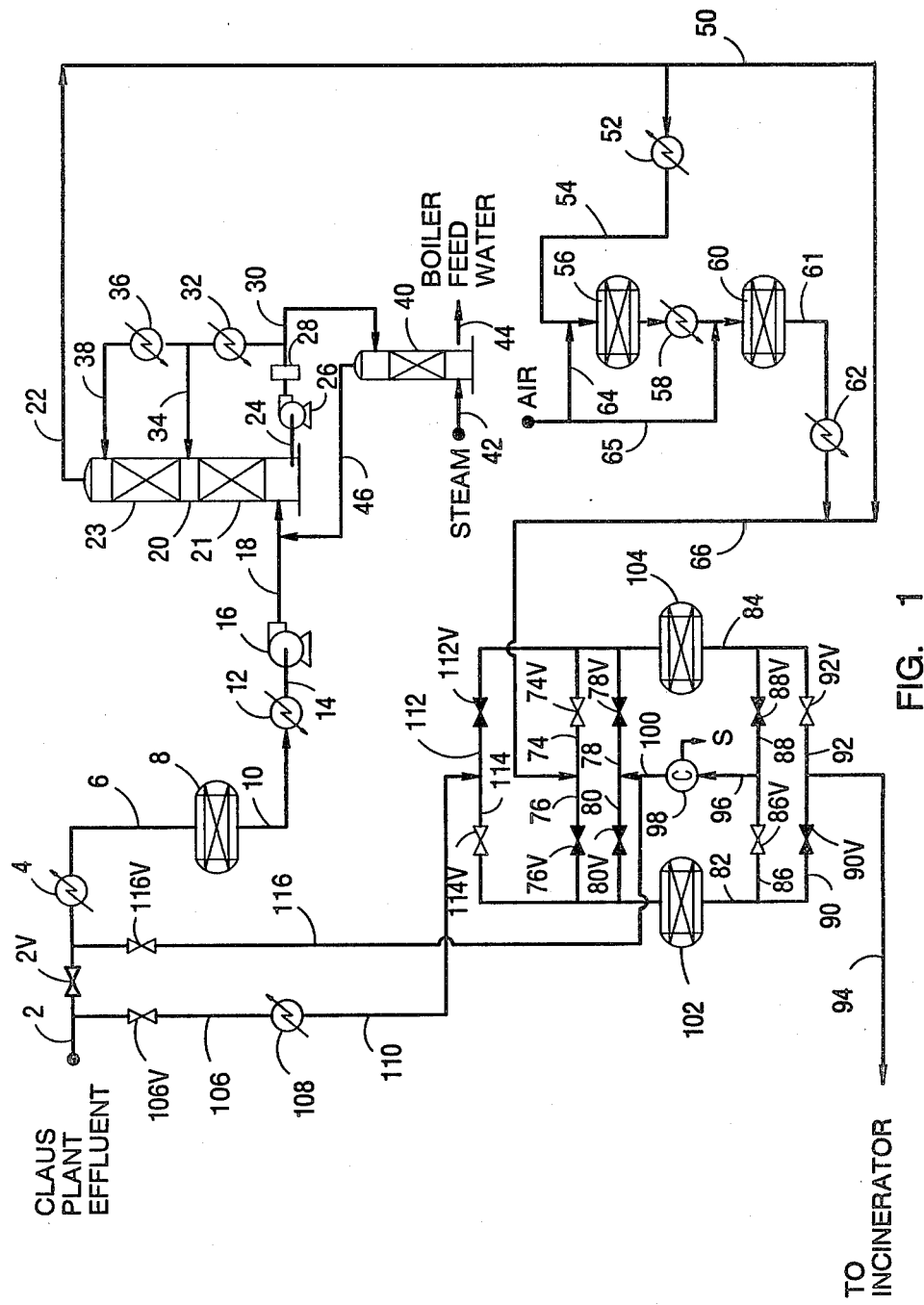

According to the invention, substantially all sulfur compounds in a gaseous effluent stream from a Claus plant are converted to hydrogen sulfide. Claus plant gaseous effluent streams to which the invention can be applied can have significantly varying compositions depending upon the source of the gas as well as the operating conditions of the Claus plant. Typical Claus plant effluent streams can include, for example, hydrogen sulfide in the range of about 0.4 to about 2 mol %, sulfur dioxide in the range of about 0.2 to about 1 mol %, water in the range of about 30 to about 40 mol %, as well as organic sulfides such as carbonyl sulfide and carbon disulfide, and elemental sulfur. Claus plant effluent streams having compositions outside these ranges may also be treated in accordance with the invention.

The sulfur containing compounds of the Claus plant gaseous effluent stream can be converted to hydrogen sulfide in an hydrogenation zone. The hydrogenation zone can be either catalytic or noncatalytic, although a catalytic hydrogenation zone is preferred. Useful catalysts are those containing metals of Groups Va, VIa, VIII and the Rare Earth series of the Periodic Table of the Elements, as published in Perry, *Chemical Engineers' Handbook,* Fifth Edition, 1973. The catalyst may be supported or unsupported although catalysts supported on a silica, alumina, or silica-alumina base are preferred. The preferred catalysts are those containing one or more of the metals, cobalt, molybdenum, iron, chromium, vanadium, thorium, nickel, tungsten and uranium. Particularly preferred are standard cobalt-molybdenum type hydrogenation catalysts, for example, United Catalyst Type C29-2 available from United Catalysts Incorporated, Louisville, Ky., 40232.

The reducing equivalents, hydrogen and carbon monoxide, necessary for converting sulfur-containing compounds to hydrogen sulfide in the hydrogenation zone can be provided from an external source or can be present within the Claus plant effluent stream. Preferably, the hydrogen can be present in the Claus plant effluent stream. However, if insufficient reducing equivalents are present, then, for example, a reducing gas generator can be used for the partial combustion of fuel gas to produce reducing equivalents in the form of hydrogen and carbon monoxide. Other methods of providing hydrogen will be readily apparent to those skilled in sulfur recovery.

The hydrogenation zone can be operated at a temperature in the range of about 450° F. to about 650° F. when a catalyst as described above is present. Preferably, the hydrogenation zone is operated at a temperature from about 580° F. to about 650° F. to provide adequate initiation and conversion of the sulfur containing compounds to hydrogen sulfide.

Following conversion of the sulfur containing compounds to hydrogen sulfide, the resulting hydrogen sulfide containing stream can be pressurized to the system operating pressure necessary and suited to compensate, for example, for the pressure drop of subsequent steps, which as hereinafter described in a preferred embodiment, can include steps for the catalytic oxidation of hydrogen sulfide to sulfur dioxide as well as steps for the catalytic conversion of hydrogen sulfide and sulfur dioxide to sulfur under low temperature and low water vapor conditions. Generally, for the preferred embodiment according to the invention as hereinafter described, it will be sufficient to pressurize the system to a pressure greater than about 5 psig, preferably in the range of about 6 psig to about 12 psig. This can be accomplished by any suitable arrangement of pressurizing equipment, for example, compressors, blowers, and the like.

It is preferred that the hydrogen sulfide containing stream be cooled prior to pressurization to facilitate selection and to improve deliverability of the pressurizing equipment. Preferably, the hydrogen sulfide containing stream is cooled to a temperature below about 350° F., and most preferably in the range of from about the water dewpoint for the hydrogen sulfide containing stream to about 350° F. before pressurizing. Generally, for Claus plant tail gas streams having about 30 mol % water, the hydrogen sulfide stream should not be cooled below about 180° F. If the water dew point is attained, condensation of water droplets can cause operating difficulties in conventional compressors. Nevertheless, in principle, even cooling to lower temperatures can be achieved prior to pressurization. After cooling the hydrogen sulfide containing stream from the hydrogenation zone to a temperature preferably in the range of about 180° F. to about 350° F., the cool stream can be pressurized to an effective system operating pressure. The resulting pressurized stream can then be introduced into a cooling and water condensing zone, which can comprise a contact condenser, for example, a quench tower effective for substantial temperature reduction of the stream therein, where it is contacted with, for example, cooled water, to cool and to condense and remove water from the pressurized hydrogen sulfide containing stream.

In the contact condenser, the pressurized hydrogen sulfide containing stream can preferably be contacted, for example, with water having a temperature in the range from about 40° F. to about 120° F. to condense water and remove such from the pressurized hydrogen sulfide containing stream.

The resulting pressurized hydrogen sulfide containing stream of reduced water content having a temperature in the range of about 40° F. to about 120° F., and preferably in the range of about 40° F. to about 90° F., can be provided to an oxidation zone in which about a ⅓ portion of the hydrogen sulfide can be converted to sulfur dioxide in the presence of stoichiometric molecular oxygen without any substantial excess. In a preferred embodiment of the invention, this can be achieved by dividing the pressurized hydrogen sulfide containing stream of reduced water content into about ⅓ and about ⅔ portions, and oxidizing the about ⅓ portion to sulfur dioxide in the presence of sufficient molecular oxygen to accomplish the oxidation to sulfur dioxide.

According to a preferred aspect of the invention, the oxidation of about ⅓ portion can be performed catalytically in the presence of an oxidation catalyst effective for conversion of hydrogen sulfide to sulfur dioxide in the absence of any substantial excess of molecular oxygen over that required for the conversion. A slight excess of molecular oxygen is, however, preferred. Suitable catalysts can include the standard Claus activated alumina catalyst for which a feed temperature to the catalyst bed in the range of about 450° F. to about 700° F., preferably in the range of about 500° F. to about 550° F., can be utilized. To prevent changes in the catalyst structure, the temperature within the reactor can preferably be kept below about 900° F. As a result, for many plants, more than one oxidation reactor can be utilized with interstage cooling to prevent temperature exceeding about 900° F. in any given reactor.

The effluent from the oxidation reactor containing substantially sulfur dioxide having a temperature in the range of about 750° F. to about 1050° F., preferably less than about 850° F. to provide an operating margin below 900° F. to prevent damage to catalyst as mentioned above, can then be cooled and recombined with the about ⅔ portion of the pressurized hydrogen sulfide containing stream of reduced water content to produce a gaseous reaction mixture stream having a hydrogen sulfide: sulfur dioxide ratio of about 2:1 and having a temperature preferably below the sulfur freezing point. The gaseous reaction mixture stream can then be introduced into a low temperature Claus catalytic conversion zone operated in the range of about 160° F. to about 260° F., and preferably in the range of about 200° F. to about 240° F. to produce elemental sulfur.

Referring now to FIG. 1, a Claus plant effluent stream is conveyed through line 2 and valve 2V to hydrogenation reactor feed heater 4 where the stream is heated to an effective temperature for hydrogenation of sulfur containing compounds to hydrogen sulfide in hydrogenation zone 8. The resulting heated stream is passed through line 6 to hydrogenation zone 8, for example, a catalytic hydrogenation zone containing catalyst as described above effective for hydrogenation of the sulfur containing compounds in the Claus plant effluent stream to hydrogen sulfide. The resulting hydrogen sulfide containing stream in line 10 is cooled in cooler 12 and introduced through line 14 into compressor 16 to provide an effective system operating pressure in line 18.

The pressurized hydrogen sulfide containing stream in line 18 can have hydrogen sulfide containing gas recovered from quench water as hereinafter described introduced, for example, by line 46 from sour water stripper 40, and the resulting combined stream can be introduced into a contact condenser, for example, near the bottom of quench column 20 having two packed zones 21 and 23 with water being introduced by spraying into the top of the column. The quench column can include one or more packed sections; in the column illustrated, two packed sections 21 and 23 are utilized.

Water can be introduced into the column at one or more locations as indicated by lines 34 and 38 to flow downward through the column contacting the pressurized hydrogen sulfide stream and to cool the stream and to condense and remove water therefrom. The condensed water containing some hydrogen sulfide can be removed from the bottom of the quench column 20 via line 24, pump 26, and filter 28 and a portion can be returned by exchangers 32 and 36, respectively, to be reintroduced into the column by lines 34 and 38. As shown, a portion of the condensed water removed from the bottom of quench tower 20 can also be sent via line 30 to a sour water stripper 40 with stripping steam provided by line 42 for removal of hydrogen sulfide; then the stripped water can be sent via line 44, for example, to a boiler feed water system.

The overhead stream 22 from condenser 20 represents a pressurized hydrogen sulfide containing stream of reduced water content which can be split into about $\frac{1}{3}$ and about $\frac{2}{3}$ portions. The about $\frac{1}{3}$ portion is heated, for example, in exchanger 52, to a temperature in the range effective for oxidation of the contained hydrogen sulfide to sulfur dioxide in oxidation zone 56 and is introduced into oxidation zone 56 by line 54 with air or other appropriate source of molecular oxygen introduced by line 64. The effluent from first oxidation zone 56 can be cooled by interstage cooler 58 and introduced into second oxidation zone 60 with molecular oxygen by line 65 as illustrated and as appropriate. The total amount of free (molecular) oxygen in lines 64 and 65 is a sufficient quantity to reduce all hydrogen sulfide present to sulfur dioxide or in slight excess of that quantity, but preferably not in substantial excess of that stoichiometric amount. The total amount of free oxygen can be divided between line 64 and line 65 so that the temperature does not exceed about 850° F. in either oxidation zone 56 or 60. The effluent stream in line 61 from the combined oxidation zones can then be cooled, for example, in cooler 62 to a suitable temperature to be recombined with the about $\frac{2}{3}$ portion of the pressurized hydrogen sulfide stream of reduced water content in line 50 to produce a gaseous reaction mixture in line 66 having about a 2:1 molar ratio of hydrogen sulfide to sulfur dioxide and having a temperature below the sulfur freezing point.

The resulting gaseous reaction mixture stream 66 can then be introduced into a Claus catalytic conversion zone undergoing adsorption, for example, low temperature Claus catalytic conversion 104, in which hydrogen sulfide and sulfur dioxide react to form elemental sulfur in the substantial absence of free oxygen and which can preferably be operated at a temperature effective for low temperature conversion, most preferably in the range of about 160° F. to about 240° F., for example, via line 74 and valve 74V into reactor 104. The lean effluent stream from reactor 104 is taken by line 84, 92V, 92 and 94 to the incinerator. The other low temperature Claus catalytic converter 102 is illustrated in the regeneration portion of its cycle. Regeneration of the catalyst in Claus catalytic converter 102 can be accomplished, for example, by using Claus plant effluent gas which flows from line 2 to line 106 via valve 106V, thence to heater 108, line 110, line 114 via valve 114V, Claus catalytic converter 102, thence to line 82, line 86, valve 86V, line 96, sulfur condenser 98, line 100, line 116 and valve 116V, and thence returned to line 2.

Reactor 102 can be switched to adsorption and reactor 104 to regeneration by closing valves 74V, 92V, 114V and 86V and by opening valves 76V, 90V, 112V and 88V in lines 76, 90, 112 and 88, respectively.

Following regeneration of reactor 102, the gaseous reaction mixture stream 66 can be used for cooling reactor 102 by opening valves 76V, 86V and 78V and by closing valve 74V in line 74, so that the hot effluent stream from reactor 102 that is now being cooled flows through line 86, line 96, cooler 98, line 100, line 78 and reactor 104 before being incinerated. Similarly, following regeneration of reactor 104, the gaseous reaction mixture stream 66 can be passed by line 74 and valve 74V through reactor 104 for cooling, then via line 84, line 88, valve 88V, line 96, condenser 98, line 100, line 80 and valve 80V to reactor 102 and then via line 90, valve 90V and line 94 to the incinerator, Alternatively, the same stream used for regenerating can be used for cooling by bypassing heater 108.

To further illustrate the invention, the following calculated EXAMPLE is provided.

EXAMPLE

Consider that compressor 16 increases the pressure of the process stream in line 14 by 10 psi (pounds per square inch), and that the quench tower 20 is operated at a constant 100° F. temperature overhead (for example, in line 22). At atmospheric pressure (13.5 psia), consider that the overhead stream 22 contains 7.0 mol % water when a compressor is not present in the feed stream 18 to quench tower 20, but rather is present in the overhead stream 22 of quench tower 20. By moving the compressor 16 to the position shown in FIG. 1, the quench tower 20 overhead can operate at 8 to 9 psig (pounds per square inch guage) assuming a pressure drop of 1 to 2 psig in quench tower 20. The water content in overhead stream 22 will then be between 4.4 mol % and 4.2 mol %. By chilling the quench water to 50° F., the water vapor content of the gas in overhead stream 22 can be further reduced to from about 1.3 mol % to about 0.8%. The calculations thus indicate that by placing the compressor 16 in a position prior to quench tower 20 as illustrated, water removal can be significantly improved. By thus inmproving water removal, the reaction of hydrogen sulfide and sulfur dioxide to elemental sulfur by Claus conversion can be driven to the right as is apparent from the equation for the Claus reaction in which water is a reaction product.

Although the invention has been described in terms of a preferred embodiment and preferred operating conditions have been set forth as required, many other applications and uses will be apparent to those skilled in sulfur recovery in keeping with the spirit of the invention, which is to be limited not by the description herein but by the claims appended hereto.

What is claimed is:

1. Process for the recovery of sulfur from a Claus plant effluent stream comprising at least water, hydrogen sulfide and sulfide dioxide, the process comprising:
converting substantially all sulfur compounds in the Claus plant tail gas stream to hydrogen sulfide;
cooling the thus produced hydrogen sulfide containing stream in a first cooling zone to a temperature in the range of from above about the water dewpoint of the hydrogen sulfide containing stream to about 350° F.;
Pressurizing the thus cooled hydrogen sulfide containing stream to an effective process operating pressure in excess of about 5 psig;

introducing the thus pressurized hydrogen sulfide containing stream into a second cooling zone to cool and to condense water therefrom; and introducing the thus pressurized hydrogen sulfide containing stream of reduced water content into a hydrogen sulfide removal zone to reduce the content of hydrogen sulfide therein by Claus catalytic conversion.

2. The process of claim 1 wherein the thus produced hydrogen sulfide stream is cooled in the first cooling zone to a temperature in the range of about 180° F. to about 350° F. before said pressurizing.

3. The process of claim 2 wherein said second cooling zone comprises at least one contact condenser to cool and to condense water from the thus-pressurized hydrogen sulfide containing stream.

4. The process of claim 3 wherein the thus-pressurized hydrogen sulfide containing stream is introduced into said second cooling zone at a pressure in the range of about 6 psig to about 12 psig and is cooled in said second cooling zone to a temperature in the range of about 40° F. to 120° F.

5. The process of claim 4 wherein the hydrogen sulfide removal zone comprises at least one Claus conversion zone at a temperature in the range of about 160° F. to about 240° F.

* * * * *